United States Patent [19]

Nishimura

[11] Patent Number: 4,691,118

[45] Date of Patent: Sep. 1, 1987

[54] SOLAR POWER CIRCUIT

[75] Inventor: Toshio Nishimura, Jyoyo, Japan

[73] Assignee: Sharp Kabushiki Kaisha, Osaka, Japan

[21] Appl. No.: 779,442

[22] Filed: Sep. 24, 1985

[30] Foreign Application Priority Data

Sep. 25, 1984 [JP] Japan .................................. 59-200785

[51] Int. Cl.$^4$ ............................................... H02J 9/00
[52] U.S. Cl. ......................................... 307/66; 307/64
[58] Field of Search .................... 307/64, 65, 66, 110; 320/1, 2; 363/59

[56] References Cited

U.S. PATENT DOCUMENTS 3,824,447 7/1974 Kuwabara ............................ 307/110
4,017,725 4/1977 Roen ....................................... 320/2

Primary Examiner—William M. Shoop, Jr.
Assistant Examiner—Richard Blum
Attorney, Agent, or Firm—Birch, Stewart, Kolasch & Birch

[57] ABSTRACT

A solar power circuit for an electronic apparatus using a solar battery and a secondary battery formed of a booster circuit including a plurality of booster condensers. One of the booster condensers functions as a backup condenser for preventing a control circuit of the apparatus from malfunctioning due to the momentary faults where the primary battery stops supplying power voltage to the apparatus.

11 Claims, 8 Drawing Figures

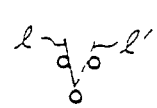
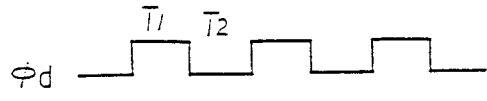
FIG.4  FIG.5
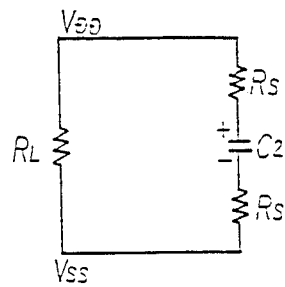
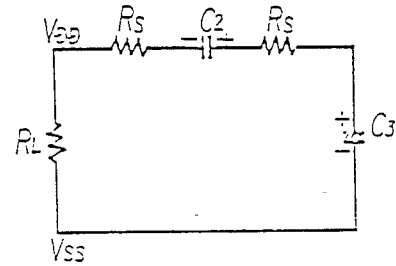
FIG.6  FIG.7
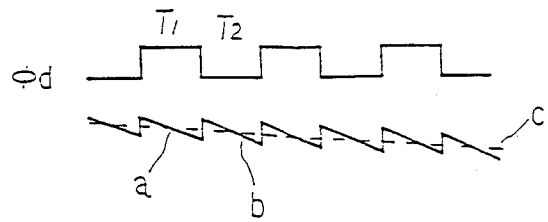
FIG.8

4,691,118

SOLAR POWER CIRCUIT

BACKGROUND OF THE INVENTION

The present invention relates to a power circuit for an electronic apparatus and, more particularly, to a backup circuit for a power supply circuit comprising a solar battery.

As related art, a solar power supply circuit comprises a large scale integrated circuit (LSI), a solar battery, a light emitting diode (LED), a resistance R (about 10-50K ohm), a backup condenser (about 3.3-10 micro F), and two booster condensers (about 0.047-0.1 micro F). The forward voltage $V_f$ of the LED is about 1.3-1.5 V. The resistance R and the LED form a constant voltage circuit. The backup condenser is needed for preventing the LSI from malfunctioning when no power voltage is generated from the solar battery because no light is incident on the solar battery.

SUMMARY OF THE INVENTION

Accordingly, it is an object of the present invention to provide an improved power supply circuit free of any specific backup-purpose condenser for momentary power service interruption.

It is another object of the present invention to provide an improved booster circuit additionally serving as a backup circuit for a power supply circuit, the booster circuit being free of any specific backup-purpose condenser for compensating for power service interruption when no light is incident upon a solar battery within the power supply circuit.

Briefly described, in accordance with the present invention, power supply circuit comprises a primary battery, and a secondary battery including a booster circuit of a plurality of booster condensers. The output condenser of the booster circuit functions as a backup condenser for preventing a control circuit from malfunctioning due to momentary interruption in the supply of power by the primary battery. Preferably, the primary battery is a solar battery and thus a momentary fault occurs when no light is incident upon the solar battery.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 4 is an illustration of the operation of a switch in the booster circuit of FIG. 3;

FIG. 5 is a time chart of clock signals;

FIGS. 6 and 7 are circuit diagrams explaining the operation of the circuit of FIG. 1 during the momentary power service interruption; and FIG. 8 is a graph showing the conditions of the clock pulses and voltage changes developed in the momentary power service interruption.

DESCRIPTION OF THE PREFERRED EMBODIMENT

It should be noted that the application of the present invention is not limited to an electronic calculator although the preferred embodiment of the present invention is explained hereinbelow in terms of such an electronic calculator.

Figure 1:
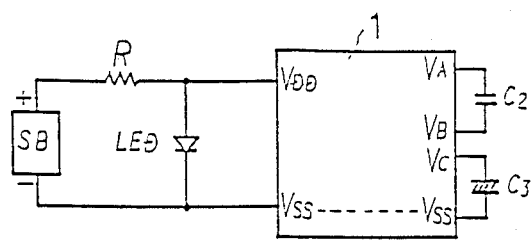
FIG. 1 is a block diagram of a solar power circuit according to the present invention.

FIG. 1 is a block diagram of a solar power supply circuit according to the present invention. It comprises an LSI 1, a solar battery SB (the primary battery), an LED, a resistance R, and two condensers C2 and C3. The resistance R and the LED form a constant voltage circuit. The LSI receives a primary power voltage $V_{DD}$ from the primary battery and a power booster voltage $V_C$ from the booster circuit outputted from the condenser C3. $V_A$ and $V_B$ indicate connections with the condenser C2, and $V_{SS}$ the ground terminal.

Figure 2:
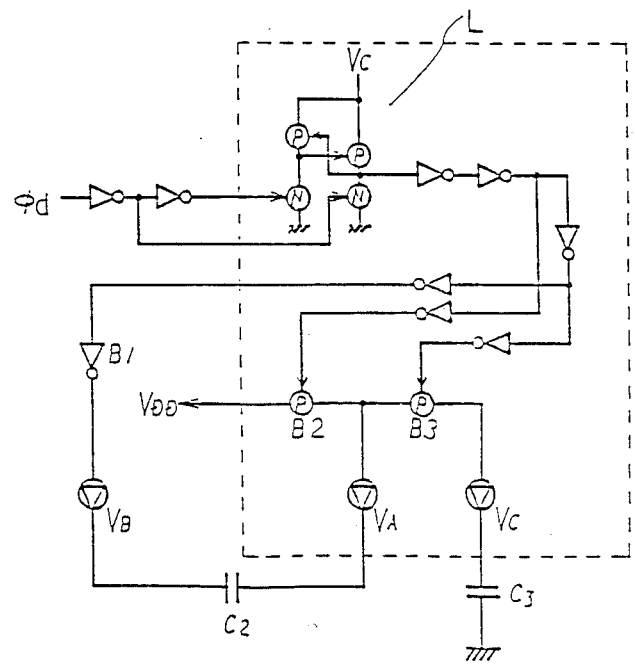
FIG. 2 is a block diagram of a booster circuit of the solar power circuit of FIG. 1.

FIG. 2 is a circuit diagram of the booster circuit in the power supply circuit of FIG. 1. In FIG. 2, "P" indicates a P-channel complimentary MOS (CMOS) transistor and "N" an N-channel CMOS transistor. "L" is a level converter for matching the voltages of $V_{DD}$ and $V_C$ of the different voltage levels. The LSI 1 accepts a clock signal $\phi$(phi)d.

Figure 3:
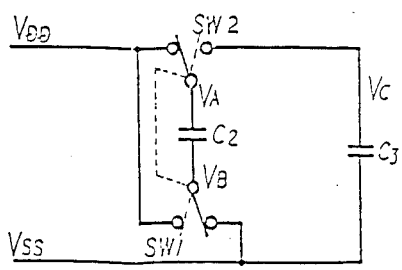
FIG. 3 is an equivalent circuit of the booster circuit of FIG. 2.

FIG. 3 is an equivalent circuit of the booster circuit of FIG. 2. In FIG. 3, SW1 corresponds to B1 (inverter) while SW2 corresponds to B2 (P-channel CMOS) and B3 (P-channel CMOS). They are switched in response to the clock signal $\phi d$. When the clock signal $\phi d$ is high, they are switched as shown in the solid line (l) of FIG. 4. When it is low, they are switched as shown in the broken line (l') of FIG. 4.

Now it is assumed that the clock signal $\phi d$ is repeated between high for T1 time and low for T2 time, the charges of the condensers C2 and C3 are zero, and that the power voltage $V_{DD}$ of the primary battery is about 1.5 V. For T1 time, the condenser C2 is charged up to about 1.5 V through the switches SW1 and SW2 (solid line) provided that the time constant of the ON resistances of SW1 and SW2 and the condenser C2 is sufficiently smaller than T2 time. For T2 time, SW1 and SW2 (the broken line) are switched so that the voltage $V_{DD}$ (+1.5 V) is applied to the minus terminal ($V_B$) of the condenser C2.

Therefore, with respect to the voltage of $V_{SS}$, the voltage of the terminal $V_A$ reaches 3.0 V ($=V_{DD}+1.5$ V). At T2 time, because of $V_A=V_C$, the condenser C3 is charged up with the voltage of ($V_{DD}+$the voltage difference of the condenser C2).

The following is the operation that, upon the momentary power service interruption due to the fact that no light is able to be incident upon the solar battery, the condenser C3 prevents the LSI 1 from malfunctioning by enabling backup of the voltage line of $V_C$.

In a normal condition, the condensers C2 and C3 are fully charged. When no current or charge is generated from the solar battery SB, the equivalent circuit of FIG. 6 is established at T1 time and the equivalent circuit of FIG. 7 is provided at T2 time. $R_L$ is a load resistance of the LSI 1 etc. In the solar power electronic calculator, usually, it is about 100-500K ohm. $R_S$ is an ON resistance of the switch, usually, less than 1K ohm. Considering the voltage $V_{DD}$ applied to the resistance $R_L$, the resistance $R_S$ can be neglected.

According to the high and low signals of the clock signal $\phi d$, the voltage $V_{DD}$ is given as shown in FIG. 8.

Referring to FIG. 8, at T1 time, the voltage $V_{DD}$ is changed according to the time constant $t1(=C2\ R_L)$ as indicated in the line a of FIG. 8. Immediately upon T2 time, the difference between the voltage of the condenser C3 and that of the condenser C2 is applied to both ends of the resistance $R_L$. The difference between 3.0 V of the condenser C3 and the voltage of the condenser C2 which is somewhat lower than 1.5 V for T1 time is imparted into the resistance $R_L$. The voltage difference is reduced with a time constant $t2(\approx C2\ R_L)$ as indicated in the line b. Further, the charge of the condenser C3 is transferred into the condenser C2 so that the voltage of the condenser C2 is raised again.

Totally, the voltage of the condenser C3 is repeatively reduced little by little at a time constant of $t1 \approx t2$ (when C2 is very smaller than C3). It is further reduced with a larger time constant $t(=C3\ R_L)$ as indicated in the line c of FIG. 8.

Even if a specific backup-purpose condenser is absent in the power voltage side of $V_{DD}$, the backup can be provided with the booster condenser C3 provided within the booster circuit.

Since the condenser C3 is charged with the power voltage of 3.0 V rather than 1.5 V, the capacitance of the condenser C3 can be half, to serve the same capacity, as compared with that of the specific backup-purpose condenser in the related art. Preferably, the capacitance of the condenser C2 is about 0.047-0.1 micro F. The capacitance of the condenser C3 is about 1.7-5 micro F.

According to the above preferred embodiment of the present invention, the booster circuit comprises the condenser C3 with a sufficient capacity to enable any backup to the momentary power service interruption of the primary battery of the solar battery. The output-side condenser C3 of the booster circuit can prevent any fault owing to the momentary power service interruption. It is unnecessary to provide a specific backup-purpose condenser in the primary battery side.

While only certain embodiments of the present invention have been described, it will be apparent to those skilled in the art that various changes and modifications may be made therein without departing from the spirit and scope of the present invention as claimed.

What is claimed is:

1. A power supply circuit comprising:
   primary supply means for providing a power voltage;
   secondary supply means, responsive to said primary supply means, for raising the power voltage to a boosted voltage; and
   booster condenser means, provided within said secondary supply means, for retaining said boosted voltage, said condenser means providing said boosted voltage in the absence of said power voltage from said primary supply means to enable a backup operation to said primary supply means.

2. The power supply circuit as set forth in claim 1, wherein said primary supply means comprises a solar battery.

3. The power supply circuit as set forth in claim 1, wherein the capacitance of said booster condenser means is about 1.7-5 micro F.

4. The power supply circuit as set forth in claim 1, further comprising level converter means for matching the voltage level of the power voltage from said primary supply means and the voltage provided by said secondary supply means.

5. A power supply circuit for supplying power to a load, comprising:
   a primary power supply developing a supply voltage during a normal mode;
   backup booster charge storage means for storing charge to be supplied to the load during a primary power supply failure mode when said supply voltage is not developed by said primary power supply;
   secondary supply means storing charge received from said supply voltage developed from said primary power supply for supply to said backup booster charge storage means during said normal mode, said secondary supply means further receiving charge from said backup booster charge storage means for supply to said load during said primary power supply failure mode; and
   control means, operative during said normal mode for controlling the supply of charge from said primary power supply to said backup booster charge storage means through said secondary supply means during said normal mode to supply twice said supply voltage thereto, said control means controlling the supply of charge from said backup booster charge storage means to said load through said secondary supply means during said primary power supply failure mode.

6. The power supply circuit of claim 5 wherein said primary power supply is a solar battery.

7. The power supply circuit of claim 6 wherein said secondary supply means includes a first capacitor.

8. The power supply circuit of claim 6 wherein said backup booster charge storage means is a second capacitor.

9. The power supply circuit of claim 8 wherein the capacitance of said second capacitor is about 1.7 to 5 micro F.

10. The power supply circuit of claim 5 further comprising level converter means for matching the voltage level of the supply voltage from said primary power supply to the voltage developed by said secondary supply means.

11. A power supply circuit for supplying power to a load, comprising:
    a primary power supply developing a supply voltage during a normal mode;
    backup booster charge storage means for storing charge to be supplied to the load during a primary power supply failure mode when said supply voltage is not developed by said primary power supply;
    secondary supply means storing charge received from said supply voltage developed from said primary power supply for supply to said backup booster charge storage means during said normal mode, said secondary supply means further receiving charge from said backup booster charge storage means for supply to said load during said primary power supply failure mode; and
    control means, operative during said normal mode, for repetitively connecting said second supply means to said primary power supply during a first period and for connecting said secondary supply means in series with said backup booster charge storage means across said primary power supply during a second period to transfer a charge to said backup booster charge storage means at twice said supply voltage;
    said control means being operative during said primary power supply failure mode for repetitively connecting said secondary supply means and backup booster charge storage means in series across said load during a first period to apply a difference voltage to said load and charge said secondary supply means with voltage and for connecting only said secondary supply means across said load in a second period to supply the energy stored therein to said load.

* * * * *